United States Patent [19]

Berenjian

[11] Patent Number: 4,627,306
[45] Date of Patent: Dec. 9, 1986

[54] ENERGY ABSORBING STEERING COLUMN FOR MOTOR VEHICLES

[75] Inventor: Karim Berenjian, Farmington Hills, Mich.

[73] Assignee: Ford Motor Company, Dearborn, Mich.

[21] Appl. No.: 689,538

[22] Filed: Jan. 7, 1985

[51] Int. Cl.⁴ .............................................. B62D 1/18
[52] U.S. Cl. ...................... 74/492; 188/371; 188/376; 280/777
[58] Field of Search ................... 74/492; 188/371, 376; 280/777

[56] References Cited

U.S. PATENT DOCUMENTS

| | | | |
|---|---|---|---|
| 1,791,001 | 2/1931 | Rasmussen | 74/492 |
| 3,505,897 | 4/1970 | Scheffler et al. | 74/492 |
| 3,600,971 | 8/1971 | Scarvelis et al. | 74/492 |
| 3,785,671 | 1/1974 | Salewsky | 74/492 X |
| 3,788,148 | 1/1974 | Connell et al. | 188/371 X |
| 3,803,938 | 4/1974 | Bratke et al. | 74/492 |
| 3,805,636 | 4/1974 | Howes | 74/492 |
| 3,815,437 | 6/1974 | Martin | 74/492 |
| 3,855,876 | 12/1974 | Albrecht et al. | 74/492 |
| 3,899,937 | 8/1975 | Nagazumi | 74/492 |
| 3,921,747 | 11/1975 | Suzuki et al. | 74/492 X |
| 4,000,876 | 1/1977 | Usui et al. | 74/492 X |
| 4,117,741 | 10/1978 | Yazane et al. | 74/492 |
| 4,194,411 | 3/1980 | Manabe et al. | 74/492 |

FOREIGN PATENT DOCUMENTS 2247894 5/1975 France ................................. 74/492

OTHER PUBLICATIONS

Def. Pub., 743,678—Collapsible Steering Column for a Motor Vehicle, Woolgar, 74/492, 9-16-69.

Primary Examiner—Allan D. Herrmann
Attorney, Agent, or Firm—Jerome R. Drouillard; Roger L. May

[57] ABSTRACT

An energy absorbing steering column for a motor vehicle includes a vehicle body, an upper steering column tube, a lower steering column tube telescopically engaged with the upper steering column tube, a steering shaft rotatably suspended within the steering column and having a steering wheel secured to the rearward end of the shaft. A first means is provided for mounting the upper steering column tube to the body and for absorbing impact loads through plastic deformation as the column tubes move together axially. A second means is provided for securing the upper column tube to the lower column tube and for allowing the tubes to move axially relative to each other.

24 Claims, 5 Drawing Figures

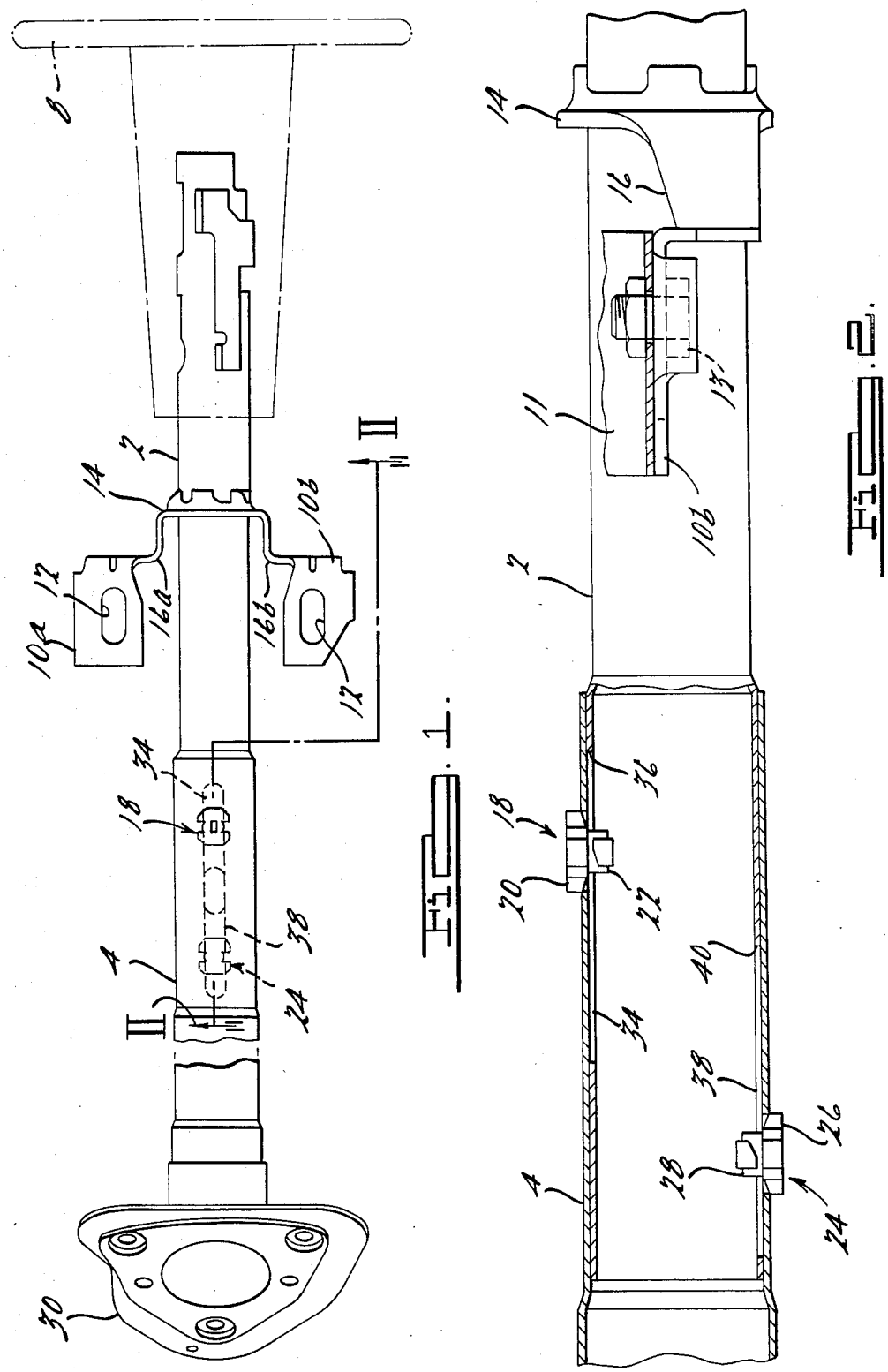

ENERGY ABSORBING STEERING COLUMN FOR MOTOR VEHICLES

BACKGROUND OF THE INVENTION

1. Field of the Invention

The present invention relates to a telescopically collapsible energy absorbing steering column for motor vehicles.

2. Description of Related Art

Automotive designers have proposed a plethora of devices intended to "manage" or absorb the kinetic energy acting during the secondary collision of a vehicle operator with the vehicle's steering wheel. One early example of such a device is disclosed in U.S. Pat. No. 1,791,001, in which a spring loaded telescoping steering shaft has a slotted keyway section permitting both telescoping action and transmission of steering torque.

Shearable fasteners have been used to secure several of the components included in steering column energy absorption systems. U.S. Pat. No. 3,805,636 discloses an upper steering column mounting bracket attached to a body mounted bracket with shearable fasteners. U.S. Pat. No. 3,899,937 discloses a shearable fastener for attaching upper and lower steering column outer tubes together. Finally, U.S. Pat. No. 3,921,747 discloses yet another shearable element for attaching an upper steering column mounting bracket to an automotive body.

Plastically deformable structures have found great favor among steering column designers. U.S. Pat. No. 3,505,897 discloses a plastically deformable sheet metal structure for connecting a steering column to body mounted brackets. Plastically deformable bracketry for attaching upper steering column mounts to automotive bodies are also shown in U.S. Pat. Nos. 3,600,971, 3,785,671, 3,803,938, 3,815,437, 3,855,876, 4,194,411 and U.S. Patent Office Defensive Publication No. 743678. U.S. Pat. No. 4,000,876 discloses yet another arrangement in which prestressed elastomeric sleeves are compressed to absorb energy caused by longitudinal displacement of a steering column.

The energy absorbing steering column of the present invention utilizes both shearable fasteners attaching upper and lower steering column tubes and a plastically deformable upper column tube body mounting bracket to absorb the energy of secondary collisions.

SUMMARY OF THE INVENTION

The energy absorbing steering column of the present invention includes telescopically engaged upper and lower column tubes, and a steering shaft rotatably suspended within the telescopically engaged lower and upper column tubes. A steering wheel is secured to the rearward end of the steering shaft. The upper column tube is mounted to the body with a bracket including means for absorbing impact loads through plastic deformation as the column tubes move together axially during a secondary collision. The upper and lower column tubes are selected to each other with means which allow the tubes to move axially relative to each other inhibited only by the upper mounting means for an initial segment of travel, followed by one or more segments of travel characterized by inhibition of axial movement resulting from action of the upper column mounting means as well as the means for attaching the column tubes to each other. The upper column tube mounting means comprises a plastically deformable unitary bracket with a central section fixed to the column tube and two outlying mounting pads fastened to the body. The means for connecting the upper and lower column mounting tubes together includes shearable fasteners rigidly attached to one of the column tubes and slidably engaged with longitudinal slots of defined lengths formed in the other column tube.

BRIEF DESCRIPTION OF THE DRAWING

FIG. 1 is a plan view of the steering column of the present invention.

FIG. 2 is a side elevation of the steering column shown in FIG. 1, including a partial section taken along the line II—II.

DESCRIPTION OF THE PREFERRED EMBODIMENT

Figure 3:
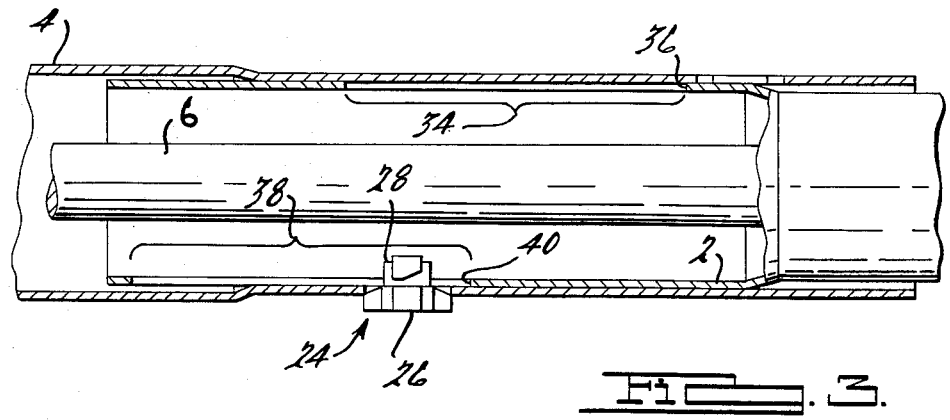
FIG. 3 is a sectional view of the telescoping section of the steering column of FIG. 1 showing the steering column tubes partially telescoped.
Figure 4:
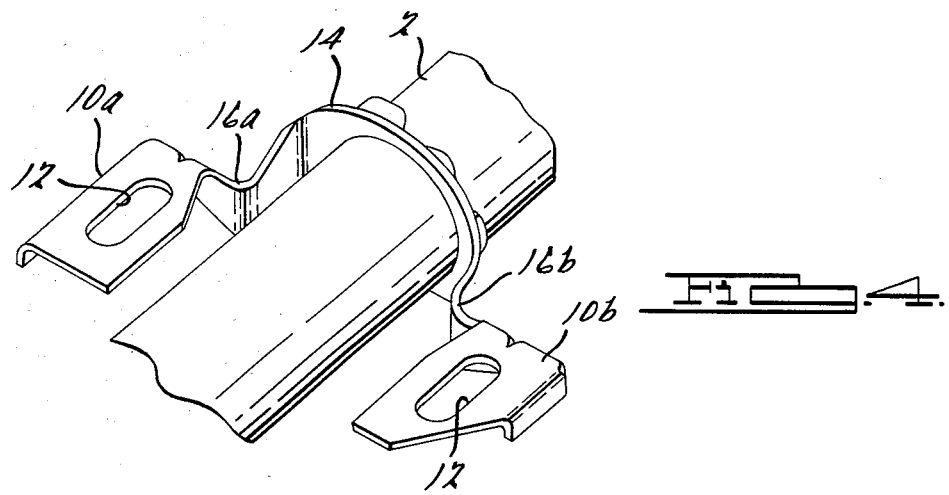
FIG. 4 is a perspective view of the upper column tube and the upper column mounting bracket in the undeformed state.

As shown in the Figures, the steering column of the present invention comprises upper column tube 2 which is telescopically engaged with lower column tube 4. Steering shaft 6 (FIG. 3) is rotatably suspended within telescopically engaged upper and lower column tubes 2 and 4 and steering wheel 8 is secured to the rearward end of the steering shaft. The upper steering column mounting bracket is comprised of mounting pads 10a and 10b having apertures 12 through which fasteners pass to mount the bracket to the vehicle body 11. Bolts 13 are used for this purpose. The upper steering column mounting bracket is further comprised of central section 14 attached, preferably by welding to upper column tube 2. Energy absorption sections 16a and 16b lying on either side of central section 14 connect central section 14 with mounting pads 10a and 10b. The lower end of the steering column is secured to the vehicle toe board by means of mounting plate 30.

As shown in FIGS. 1 and 2, the upper and lower column tubes are secured to each other by a telescoping section which includes shearable fasteners 18 and 24. These fasteners slidably lock the upper and lower column sections together. In the preferred embodiment each fastener is inserted from outside the steering column assembly and locked with 90 degrees rotation about an axis perpendicular to the central axis of the steering column assembly. The shearable fasteners are preferably made of a plastic material such as nylon. As shown in FIG. 2, each shearable fastener comprises a self-locking double headed nut. Thus, fastener 18 includes outer head 20, and inner head 22, whereas fastener 24 includes outer head 26, and inner head 28. Fasteners 18 and 24 are therefore double headed. These fasteners are self-locking because, as previously noted, each fastener is locked into the steering column assembly by merely rotating the fastener without an additional fastener.

Figure 5:
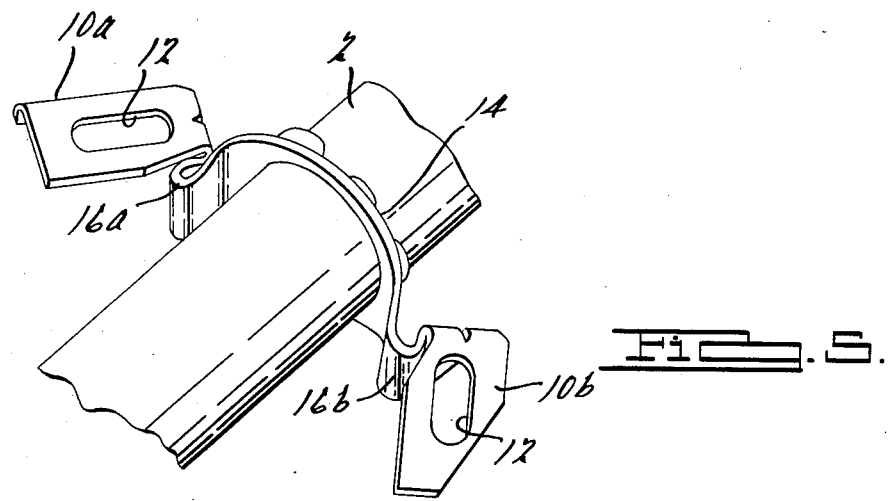
FIG. 5 shows the steering column segment of FIG. 4 following plastic deformation of the upper steering column mounting bracket.

Operation of the steering column of the present invention during secondary collision will now be described. An axial impact directed against steering wheel 8 in the direction forward of motor vehicle will cause upper column tube 2 to begin moving in the direction of further engagement with lower column tube 4. This initial movement of upper column tube 2 will be accompanied by movement of the upper steering column mounting bracket. This movement will be of a translational nature as fasteners 13 move along the length of mounting pad holes 12, which are slotted. Once fasteners 13 touch the ends of mounting pad holes 12, energy absorption sections 16a and 16b of the upper steering column mounting bracket will begin to plastically deform as the upper column tube telescopes into the lower column tube. The bending deformation of energy absorption sections 16a and 16b will, as shown in FIG. 5, be accompanied by rotation of mounting pads 10a and 10b about fasteners 13. This rotation occurs in a common plane about axes lying perpendicular to the central axis of the steering column and is accompanied by a reduction in the radius of curvature of energy absorption sections 16a and 16b. Deformation of energy absorption sections 16a and 16b will accordingly absorb some of the impact energy imposed on the steering column.

The upper and lower shearable fasteners 18 and 24 absorb some energy when sheared. As previously noted, fasteners 18 and 24 are arranged in slots shown as 34 and 38, respectively, so that their shearing is sequential and occurs after initial collapse of the steering column. FIG. 3 shows the telescoping section of the steering column after upper shearable fastener 18 has been sheared by rearward end wall 36 of upper column tube upper longitudinal slot 34. As is further shown in FIG. 3, lower shearable fastener 24 has not yet been sheared and will not be sheared until rearward end wall 40 of upper column tube 4 passes through the location of fastener 24. In this manner, the axial resistance to motion imposed by shearable fasteners 18 and 24 will not be superimposed upon one another and will not occur at the beginning of the steering column's collapse sequence.

In effect, the collapse of the steering column described herein may be divided into segments. During the first or initial segment of travel, only the upper column mounting bracket absorbs energy, through plastic deformation of energy absorption sections 16a and 16b. This initial segment is followed by one segment in which shearable fastener 18 absorbs energy as it is sheared while upper steering column mounting bracket continues to absorb energy. This segment is followed by yet another segment wherein upper column mounting bracket alone absorbs energy and yet another segment when the mounting bracket and lower shearable fastener 24 absorb the energy of collision. Accordingly, the shearable fasteners and the slots 34 and 38 in which the fasteners slide can be arranged to provide the desired energy management technique by appropriate staggering of the shearing sequence.

It has been determined that the upper steering column mounting bracket performs well when made of material such as Society of Automotive Engineers (SAE) Grade 1008 aluminum killed cold rolled steel having an initial thickness of approximately 3 millimeters.

The foregoing description presents the presently preferred embodiment of this invention. Alterations and modifications may occur to those skilled in the art which will become within the spirit and scope of the following claims.

I claim:

1. An energy absorbing steering column comprising:
   an upper column tube;
   a lower column tube telescopically engaged with said upper column tube;
   a steering shaft rotatably suppended within said telescopically engaged lower and upper column tubes;
   a steering wheel secured to the rearward end of said steering shaft;
   first means for mounting said upper column tube to a vehicle body and for absorbing impact loads through plastic deformation as said column tubes move together axially; and
   second means for securing said upper column tube to said lower column tube and for allowing said tubes to move axially relative to each other inhibited only by said first means for an initial segment of travel, followed by one or more segments of travel characterized by inhibition resulting from the action of both of said means.

2. The energy absorbing steering column of claim 1 wherein said first means comprises a plastically deformable unitary bracket comprising a central section fixed to said upper column tube and two outlying mounting pads for fastening same to said body.

3. The energy absorbing steering column of claim 2 wherein said mounting pads rotate about axes lying perpendicular to the central axis of said steering column during deformation of said bracket.

4. The energy absorbing steering column of claim 2 wherein said bracket further comprises bendable, energy absorption sections linking said central section to said mounting pads.

5. The energy absorbing steering column of claim 4 wherein each of said energy absorption sections has an arcuate shape with a radius of curvature which decreases as said mounting pads rotate.

6. The energy absorbing steering column of claim 5 wherein said mounting pads rotate in a common plane during deformation of said bracket.

7. The energy absorbing steering column of claim 1 wherein said second means comprises one or more shearable fasteners rigidly attached to one of said column tubes and slidably engaged with a longitudinal slot of defined length formed in the other of said column tubes.

8. The energy absorbing steering column of claim 7 wherein said shearable fastener comprises a self-locking, double headed nut.

9. The energy absorbing steering column of claim 1 wherein said second means comprises two or more shearable fasteners rigidly attached to one of said column tubes with each fastener slidably engaged with a mating slot formed in the other of said column tubes.

10. The energy absorbing steering column of claim 9 wherein said slots extend different axial distances from each corresponding shearable fastener so as to cause said fasteners to be sheared during different segments of travel of said column tubes.

11. The energy absorbing steering column of claim 10 wherein said shearable fasteners comprise self-locking, double-ended nuts.

12. The energy absorbing steering column of claim 10 wherein said shearable fasteners are sheared by the rearward end walls of said slots.

13. A motor vehicle including an energy absorbing steering column comprising:
   a vehicle body;
   an upper column tube;

a lower column tube telescopically engaged with said upper column tube;

a steering shaft rotatably suspended within said telescopically engaged lower and upper column tubes;

a steering wheel secured to the rearward end of said steering shaft;

first means for mounting said upper column tube to said vehicle body and for absorbing impact loads through plastic deformation as said column tubes move together axially; and second means for securing said upper column tube to said lower column tube and for allowing said tubes to move axially relative to each other inhibited only by said first means for an initial segment of travel, followed by one or more segments of travel characterized by inhibition resulting from the action of both of said means.

14. The energy absorbing steering column of claim 13 wherein said first means comprises a plastically deformable unitary bracket comprising a central section fixed to said upper column tube and two outlying mounting pads for fastening same to said body.

15. The energy absorbing steering column of claim 14 wherein said mounting pads rotate about axes lying perpendicular to the central axis of said steering column during deformation of said bracket.

16. The energy absorbing steering column of claim 14 wherein said bracket further comprises bendable, energy absorption sections linking said central section to said mounting pads.

17. The energy absorbing steering column of claim 16 wherein each of said energy absorption sections has an arcuate shape with a radius of curvature which decreases as said mounting pads rotate.

18. The energy absorbing steering column of claim 17 wherein said mounting pads rotate in a common plane during deformation of said bracket.

19. The energy absorbing steering column of claim 13 wherein said second means comprises one or more shearable fasteners rigidly attached to one of said column tubes and slidably engaged with a longitudinal slot of defined length formed in the other of said column tubes.

20. The energy absorbing steering column of claim 19 wherein said shearable fastener comprises a self-locking, double headed nut.

21. The energy absorbing steering column of claim 13 wherein said second means comprises two or more shearable fasteners rigidly attached to one of said column tubes with each fastener slidably engaged with a mating slot formed in the other of said column tubes.

22. The energy absorbing steering column of claim 21 wherein said slots extend different axial distances from each corresponding shearable fastener so as to cause said fasteners to be sheared during different segments of travel of said column tubes.

23. The energy absorbing steering column of claim 22 wherein said shearable fasteners comprise self-locking, double-ended nuts.

24. The energy absorbing steering column of claim 22 wherein said shearable fasteners are sheared by the rearward end walls of said slots.

* * * * *